United States Patent [19]

Maruyama

[11] Patent Number: 4,883,367

[45] Date of Patent: Nov. 28, 1989

[54] BEARING UNIT

[75] Inventor: Teruo Maruyama, Hirakata, Japan

[73] Assignee: Matsushita Electric Industrial Co., Ltd., Kadoma, Japan

[21] Appl. No.: 187,346

[22] Filed: Apr. 28, 1988

[30] Foreign Application Priority Data

Apr. 30, 1987 [JP]  Japan .................................. 62-106703

[51] Int. Cl.[4] ............................................ F16C 32/06
[52] U.S. Cl. .................................. 384/114; 384/107; 384/112; 384/133
[58] Field of Search ................. 384/100, 107, 112, 114, 384/115, 120, 121, 123, 131–133, 305, 322, 378, 397–399

[56] References Cited

U.S. PATENT DOCUMENTS

| 3,115,372 | 12/1963 | Bard | 384/107 |
| 3,399,000 | 8/1968 | Remmers | 384/112 X |
| 3,669,517 | 6/1972 | Hughes | 384/115 |
| 3,964,805 | 6/1976 | Schulien | 384/399 |
| 4,043,612 | 8/1977 | Orcutt | 384/133 X |
| 4,254,961 | 3/1981 | Fersht et al. | 384/100 X |
| 4,427,310 | 1/1984 | Middleton | 384/378 X |

FOREIGN PATENT DOCUMENTS

| 1022391 | 3/1966 | United Kingdom | 384/322 |
| 1222156 | 2/1971 | United Kingdom | 384/132 |

Primary Examiner—Thomas R. Hannon
Attorney, Agent, or Firm—Cushman, Darby & Cushman

[57] ABSTRACT

In a bearing unit using a hydrodynamic lubrication film (5 or 25) of a lubrication fluid, a shaft (2 or 22) comprises plural spiral grooves (6a, 6b or 26) thereon, at least one circumference groove (7a, 7b or 27) thereon and an inner passage ((8+9+10) or (29+30)), which leads the fluid pumped by the spiral grooves (6a, 6b or 26) to the circumferential groove (7a, 7b or 27), therein, thereby to produce both functions of a kinetic pressure bearing and a static pressure bearing.

5 Claims, 9 Drawing Sheets 4,883,367

BEARING UNIT

FIELD OF THE INVENTION AND RELATED ART STATEMENT

1. FIELD OF THE INVENTION

The present invention relates to a bearing unit, and more particularly to a hydrodynamic lubrication bearing unit using a hydrodynamic lubrication film between a cylindrical shaft and a cylindrical bearing.

2. DESCRIPTION OF THE RELATED ART

Heretofore, many types of plain bearings were known. In such bearings, a spiral-groove bearing unit, which is a kind of bearing unit utilizing hydrodynamic lubrication, has lately attracted considerable attention as being an excellent bearing unit to get high performance. FIG. 12 shows the cross-sectional view of the conventional spiral-groove bearing unit, and FIGS. 13 and 14 show pressure distributions of the bearing unit shown in FIG. 12. In a hydrodynamic lubrication film 45, spiral grooves 44 which are formed on a cylindrical surface 43 of a shaft 41 (or on a cylindrical surface 42 of a bearing 40) generate pumping pressure vectors 50 of an equal intensity shown by arrows in FIG. 13 by relative rotation between both cylindrical surfaces 42 and 43. Ends of the vectors 50 form a circular configuration 51, that is, uniform pressure is impressed to the film 45. These pumping pressure vectors 50 serve to avoid unstable holding of a kinetic pressure bearing at high-speed rotation, and thereby the shaft 41 rotates in the bearing 40 without any eccentricity and touching on the cylindrical surface 42. Therefore, the spiral-groove bearing unit has very little noise and vibration, a precise dynamic holding of the shaft 41 and a high stability of bearing within a small eccentricity which is suitable for high speed rotation.

On the other hand, as shown in FIG. 16, a static pressure bearing unit having circumferential grooves 46 on the rotating shaft 41 (or on the cylindrical surface 42 of the bearing 40) has been used. High pressure fluid shown by an arrow 52 is applied to the circumferential grooves 46 through an inner passage 41a and an orifice 47 which connects the inner passage 41a with the circumferential grooves 46. When the shaft 41 has an eccentricity against the bearing 40, a clearance between both cylindrical surfaces 42 and 43 is changed, and thereby a part of large fluid friction and a part of small fluid friction are formed in the hydrodynamic lubrication film 45. As a result, pressure distribution in a radial direction around the cylindrical surface 43 varies, and thereby the shaft 41 receives restoring force. Thus, touching between the cylindrical surfaces 42 and 43 is prevented.

Hereupon, load capacity of the spiral-groove bearing unit is obtained by wedge force 48 generated by the eccentricity of the shaft 41 as shown in FIG. 14. FIG. 15 shows a relation between the restoring force and the eccentricity of the shaft 41. In the figure, the restoring force by the pumping pressure is generated at small values of the eccentricity but such restoring force is very small. The pumping pressure which is uniformly generated around the shaft 41 does not serve to get the load capacity in radial direction but serves to stabilize the rotation of the shaft 41. The restoring force by the wedge force acceleratively becomes large responding to increase of the eccentricity, whereas the restoring force is small at small values of the eccentricity. Thereby, the load capacity is small when an allowable eccentricity is small. When it is necessary to get sufficient load capacity for a bearing of revolving mirror of a laser printer, by applying an air kinetic pressure bearing using air of low viscosity, the clearance between the cylindrical surfaces 42 and 43 have to be made 2–3 $\mu$m even at the rotation speed of 10–20 thousand r.p.m.. Therefore, high-precision is required for finishing of the cylindrical surfaces 42 and 43, and mass-production of such a high precision bearing is difficult.

In the static pressure bearing unit having the circumferential grooves, as shown in FIG. 17, the clearance between the cylindrical surfaces 42 and 43 is changed by the eccentricity of the shaft 41, and thereby the fluid friction in the hydrodynamic lubrication film 45 is changed. Thereby, the pressure distribution in the radial direction is greatly changed responding to the clearance. The restoring force generated by unevenness of the pressure distribution and the wedge force added thereto give the bearing unit a high load capacity, but a bulky and heavy pump apparatus is required for supplying pressure to the static pressure bearing unit. Therefore, it is difficult to apply this bearing unit to the bearing unit for commodity goods, for instance a VTR cylinder, a laser printer for office use or a hard disk for office use etc..

OBJECT AND SUMMARY OF THE INVENTION

The object of the present invention is to provide an improved bearing unit which has a large load capacity without precision finishing and is stable at high speed rotation, simple and compact.

In order to achieve the above-mentioned object, a bearing unit in accordance with the present invention comprises:

a bearing;

a shaft which rotates relative to the bearing and has a plurality of shallower groove thereon for pumping, at least one deeper circumferential groove thereon and an inner passage therein for connecting a part on the shallower groove to the circumferential groove; and a fluid held in a gap formed between the bearing and the shaft, for forming a hydrodynamic lubrication film between the bearing and the shaft by relative rotation of the bearing and the shaft.

The above-mentioned bearing unit has a large load capacity, a stable rotation in high speed without any unstable rotation like a whirl of the shaft, and the configuration is simple. Further, since it is not required to minimize a clearance between the shaft and the bearing, this bearing unit is suitable for mass-production and enables a low rotation torque, hence a low power loss, even when an oil is used as a fluid.

DESCRIPTION OF THE PREFERRED EMBODIMENT

Figure 1:
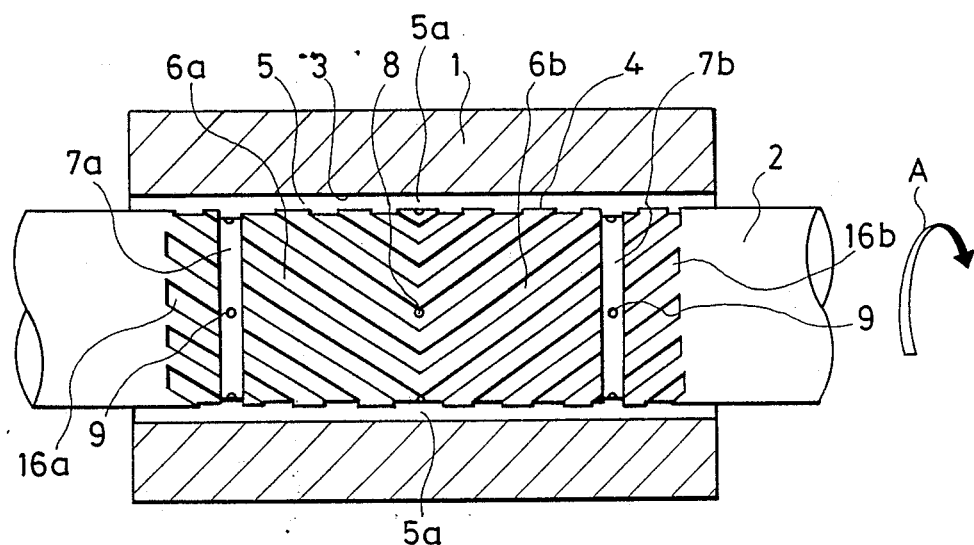
FIG. 1 is a cross-sectional view showing an embodiment of a bearing unit of the present invention, showing outside face of a shaft, wherein symmetric spiral shallow grooves are drawn by straight lines for the sake of simplicity of drawing.
Figure 2:
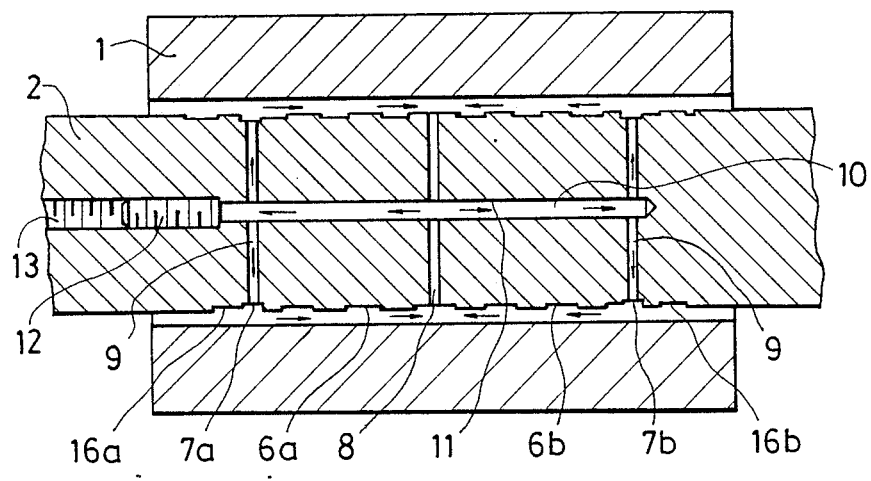
FIG. 2 is an internal cross-sectional view along an axis of the shaft in FIG. 1.

Hereafter, the preferred embodiment of the present invention is described with reference to the accompanying drawings. FIG. 1 shows a cross-sectional view of an embodiment of the invention, and FIG. 2 shows an internal cross-sectional view along an axis of a rotation shaft 2 in FIG. 1. The rotation shaft 2 penetrates a cylindrical hollow of a bearing 1 and is rotatably held therein. Between a cylindrical surface 3 of the bearing 1 and a cylindrical surface 4 of the shaft 2 which face each other, a hydrodynamic lubrication film 5 is formed by a lubricating fluid like air or an oil. On the cylindrical surface 4, of the shaft 2, plural spiral grooves 6a and 6b, which are symmetric with respect to a plane perpendicular to axis of the shaft 2 at the center of the cylindrical surface 4, are formed with a predetermined angle of inclination. These spiral grooves 6a and 6b have a cross-section, for instance, of rectangular shape, with a depth of from several to dozens of μm and a width of from dozens to several hundred μm. Circumferential grooves 7a and 7b are formed on the shaft 2 inside both ends of the cylindrical surface 3 with a predetermined interval. For instance, these circumferential grooves 7a and 7b have a rectangular cross-section with a width from several hundred μm to 1 mm and a depth of dozens of μm. Radial passages 9 and 8 are formed in the radial direction from the center of the shaft 2 to the circumferential grooves 7a, 7b and the center of the cylindrical surface 4, respectively. And an axial passage 10 is formed in the center of the shaft 2 in the axial direction thereof in order to connect the passages 9, 8 and 9 with each other. By the radial passages 8 and 9 and the axial passage 10, a high pressure supplying passage 11, which connects center parts of the spiral grooves 6a and 6b to the circumferential grooves 7a and 7b, is formed. And ends of the radial passages 9 opens in the grooves 7a and 7b, thereby forming an orifice having a fluid friction. A hole 13, which is bored from an end of the shaft 2 to a left end of the axial passage 10 in order to make the axial passage 10 in the shaft, is closed by a screw plug 12. Sealing grooves 16a and 16b are spirally formed on the shaft 2 in order to stop flowing-out of lubricants to the outside.

Figure 3:
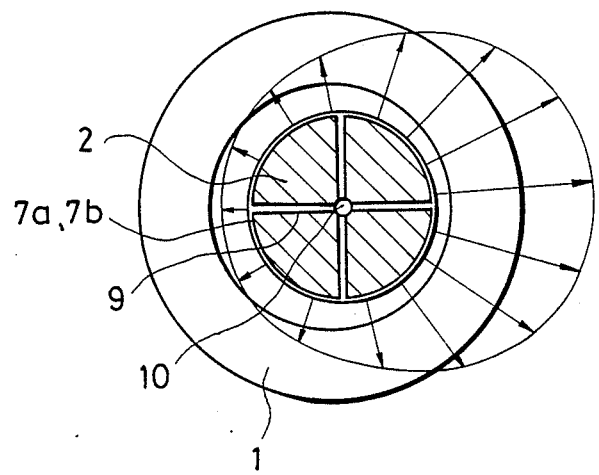
FIG. 3 is a partial cross-sectional view showing pressure distribution around the shaft 2 of FIGS. 1 and 2.

In the above-mentioned construction, when the shaft 2 is rotated in a direction shown by an arrow "A", pumping pressure is generated on the spiral grooves 6a and 6b, and thereby hydrodynamic pressure on the axial center part 5a between the cylindrical surfaces 3 and 4 becomes high. By this pumping pressure, the whole circumference of the shaft 2 is uniformly pressurized. As a result, whirling of the shaft 2 is prevented and a stable rotation is offered. A part of the pumping pressure is led to the circumferential grooves 7a and 7b through the high pressure supplying passage 11, and thereby a function of static pressure bearing is realized. FIG. 3 shows a pressure distribution around the shaft 2. In FIG. 3, when the shaft 2 has a load in the radial direction and thereby brings the eccentricity, a clearance on one side between the cylindrical surfaces 3 and 4 is made small and another clearance on the opposite side is made large. Fluid friction in the small clearance side increases thereby raising the hydrodynamic pressure thereof, and the fluid friction in the large clearance decreases thereby decreasing the hydrodynamic pressure thereof. As a result, a large restoring force is operated to the shaft 2 against the eccentrical direction, and thereby an axis of the shaft 2 naturally returns onto an axis of the bearing 1 so as to eliminate the eccentricity thereof. Thus, a large load capacity is given to the shaft 2 together with stable rotation which is an inherent advantage of the spiral-groove bearing unit.

In the conventional bearing unit which has only spiral grooves 6a and 6b using low viscosity fluid such as air etc. as a lubricant, the clearance between the cylindrical surfaces 3 and 4 was required to be 2–3 μm in order to get sufficient load capacity. But, in this embodiment, the additional provision of the circumferential grooves 7a and 7b for the function of the static pressure bearing enables the bearing unit to have a clearance more than two times as large as that of the conventional unit, to generate enough load capacity. At that time, the restoring force is encouraged by the wedge force generated by the eccentricity of the shaft 2.

Figure 4:
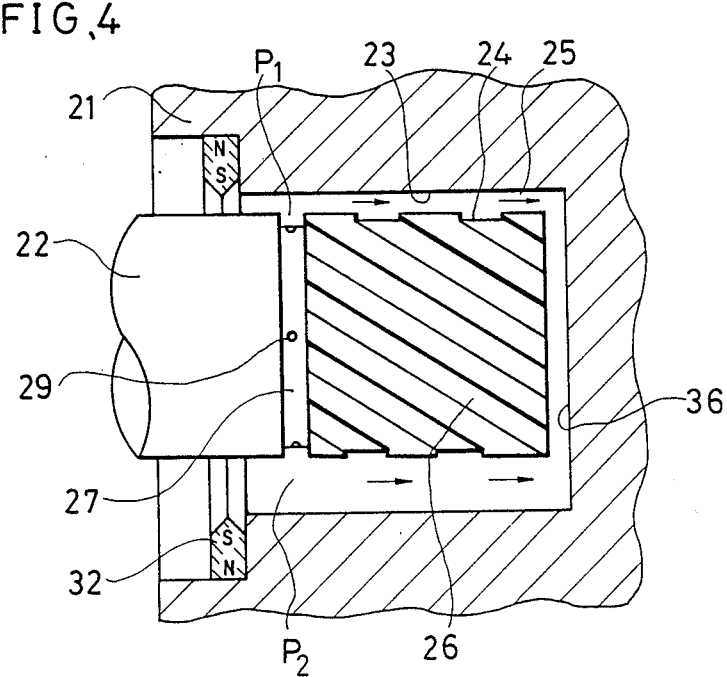
FIG. 4 is a cross-sectional view showing another embodiment of a bearing unit of the present invention, showing an outside face of a shaft, wherein spiral shallow grooves are drawn by straight lines for the sake of simplicities of drawing.
Figure 5:
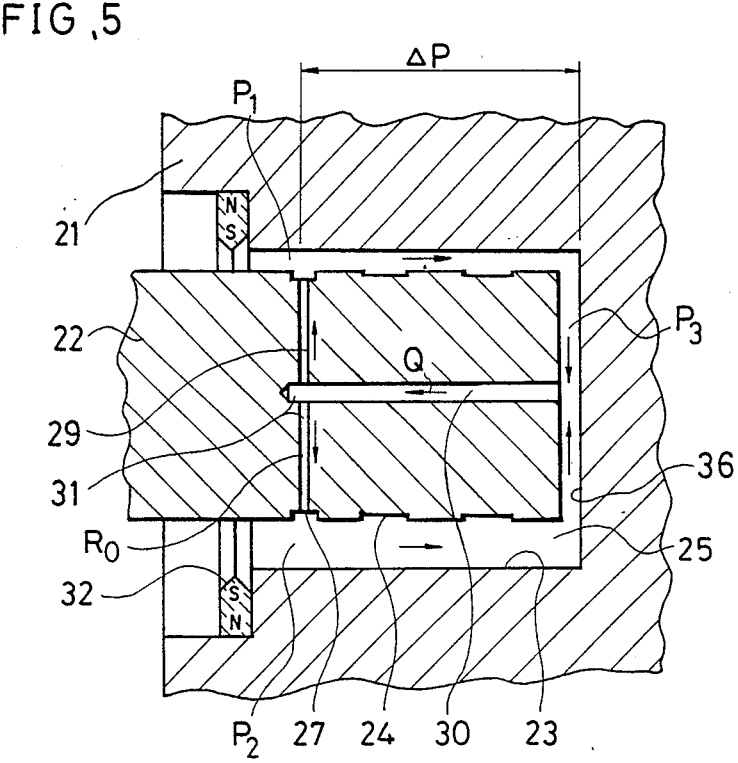
FIG. 5 is an internal cross-sectional view along an axis of the shaft in FIG. 4.

Next, another embodiment of the present invention is described. FIG. 4 shows a cross-sectional view of this embodiment, and FIG. 5 shows an internal cross-sectional view along an axis of a rotation shaft 22 in FIG. 4. A bearing 21 has a cylindrical surface 23 therein with one end thereof open and the bottom 36 thereof closed. An end part of the rotation shaft 22 is rotatably held by the cylindrical surface 23 of the bearing 22. Plural spiral grooves 26 are formed on a cylindrical surface 24 of the shaft 22 which faces to the cylindrical surface 23, and a circumferential groove 27 is formed on the shaft 22 at a left end of the spiral grooves 26. An axial passage 30 is formed on the axis of the shaft 22 from the right-end surface of the shaft 22 to a position below the circumferential groove 27. Radial passages 29 are formed in the radial direction of the shaft 22 from the passage 30 to the circumferential groove 27. A high pressure supplying passage 31 is formed by these axial passage 30 and radial passages 29 wherein fluid friction $R_0$ exists thereby to form an orifice. Between the cylindrical surfaces 23 and 24, magnetic fluid is lubricated thereby forming a hydrodynamic lubrication film 25. And, magnetic fluid sealing 32 using a radially magnetized magnet is provided around a mouth of the cylindrical surface 23.

Figure 6:
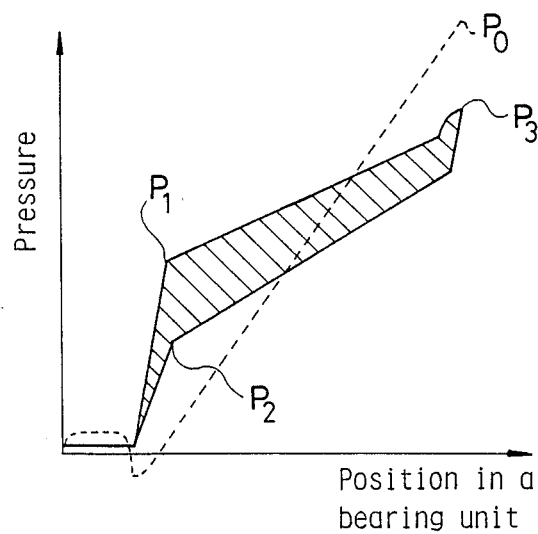
FIG. 6 is a graph showing a relation between pressure and position in a bearing unit.

FIG. 6 is a graph showing a relation between pressure and position in a bearing unit in the above-mentioned construction when the shaft 22 is rotated and the pumping pressure is generated by the spiral grooves 26. The graph shows that the farther the inner part of the bearing 21 (namely the more rightward of FIG. 4 or FIG. 5) is, the more pressure $P_0$ of the magnetic fluid between the cylindrical surfaces 23 and 24 increases as shown by a dotted line. And the pumping pressure $P_0$ becomes maximum at a position between an inner end of the surface 23 and a right end of the shaft 22. By this pumping pressure, the whole circumference of the shaft 22 is uniformly pressurized. As a result, an eccentric rotation of the shaft 22 is prevented and a stable rotation is offered. A part of the pumping pressure is led to the circumferential groove 27 through the high pressure supplying passage 31, and thereby a static pressure bearing is formed on the circumferential groove Hereupon, relation between the pressure distribution and restoring force is described. When relative amounts are defined as follows:

P; mean value of pressure on the circumferential groove 27, $\Delta P$; pumping pressure, $P_3$; maximum pressure on inner ends of the cylindrical surfaces 23 and 24, $P_0$; maximum pressure on inner ends of the cylindrical surfaces 23 and 24 in case of no high pressure supplying passage 31, Q; flow amount which passes through the high pressure supplying passage 31, $R_0$; fluid friction by the radial passage 29, and $R_v$; mean value of fluid friction which varies responding to the eccentricity of the shaft 22 between the cylindrical surfaces 23 and 24, the following relation is held:

$$P_3 = P + \Delta P = P + (P_0 - Q(R_0 + R_v)).$$

Further, when other amounts are defined as follows:

$P_1$; pressure on a position of minimum clearance in the circumferential groove 27 under eccentrical condition of the shaft 22, and $P_2$; pressure on a position of maximum clearance in the circumferential groove 27 under eccentrical condition of the shaft 22, the pressure distribution is represented as in FIG. 6. An area of slanted line which is surrounded by $P_1$, $P_2$ and $P_3$ is operated as the restoring force upon the shaft 2.

Figure 7B:
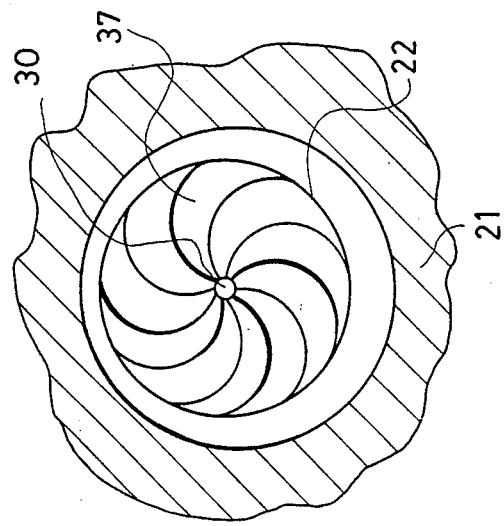
FIG. 7(b) is a cross-sectional view taken on line A—A of FIG. 7(a).
Figure 7A:
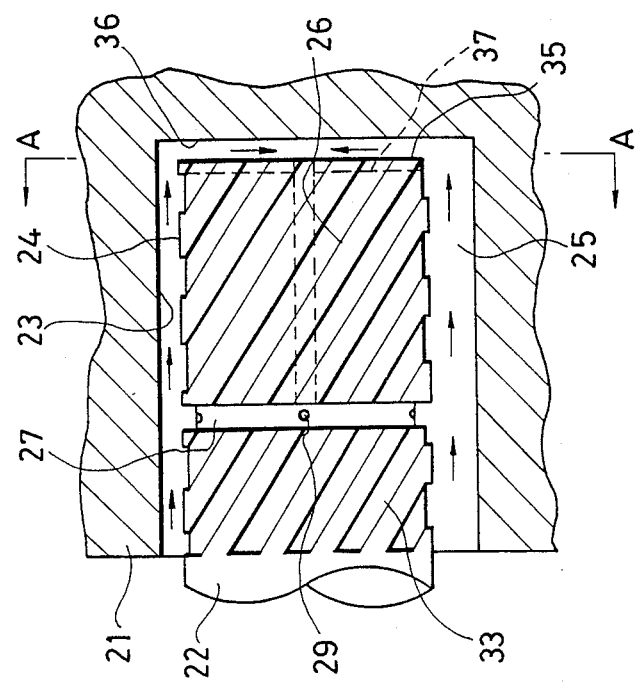
FIG. 7(a) is a cross-sectional view showing still another embodiment of a bearing unit of the present invention, showing an outside face of a shaft, wherein spiral shallow grooves are drawn by straight lines for the sake of simplicities of drawing.

Besides the magnetic fluid sealing 32 provided in the above-mentioned embodiment, spiral grooves 33 may be formed on the left side of the circumferential groove 27 as shown in FIG. 7(a), in order to seal the fluid by the pumping operation thereof.

FIG. 7(b) shows a cross-sectional view taken on line A—A in FIG. 7(a). Thrust spiral grooves 37 for making a function as a thrust bearing are formed on the end 35 of the shaft 22 as shown in the figure. The grooves 37 may be formed on the bottom 36. These grooves 37 generate another pumping pressure, and thereby larger static pressure can be supplied to this bearing unit.

Figure 8:
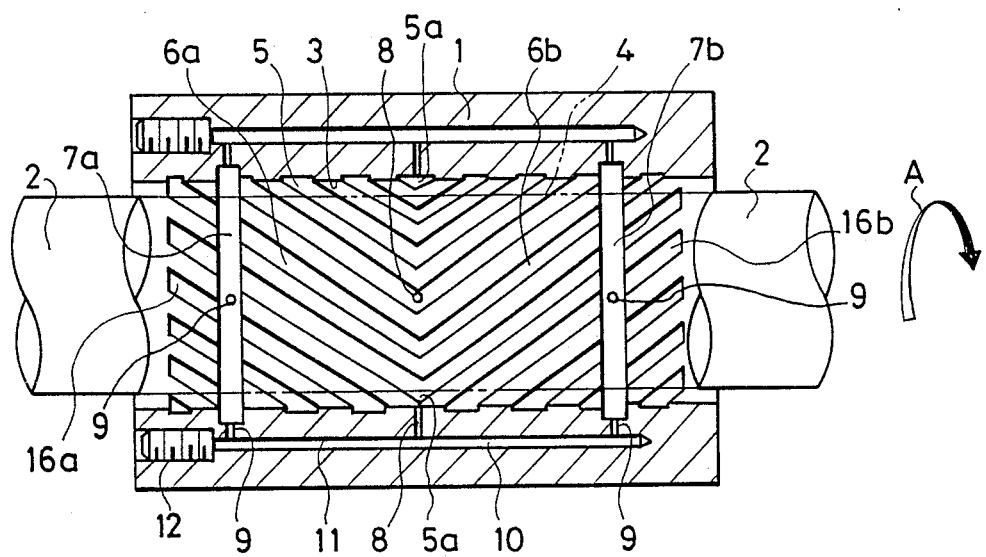
FIGS. 8, 9 and 10 are cross-sectional views showing still other embodiments of the present invention.
Figure 9:
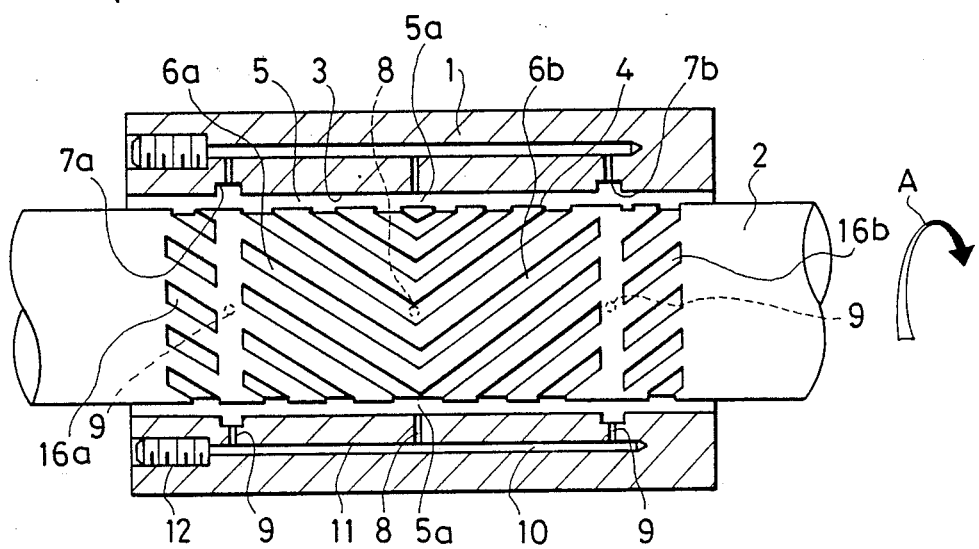
Figure 10:
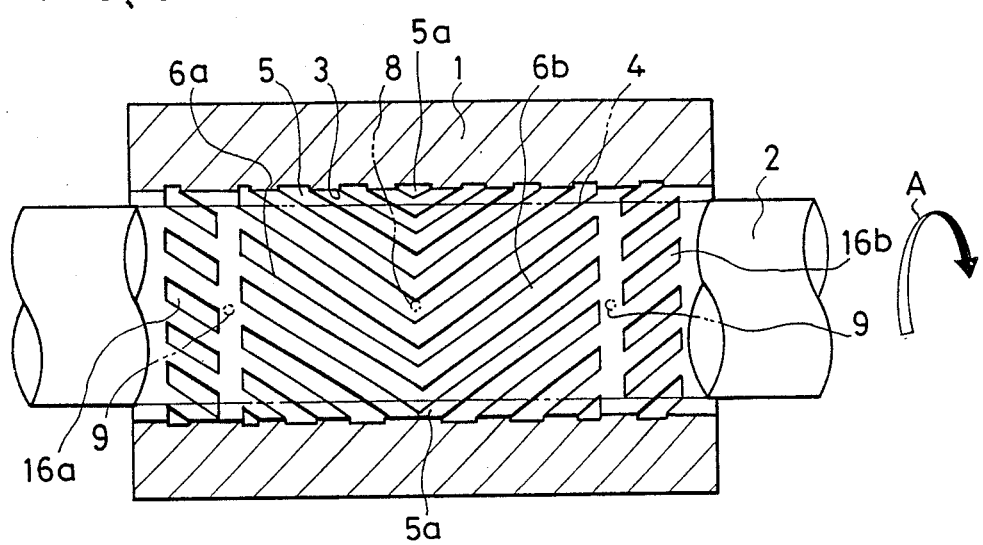
Figure 11:
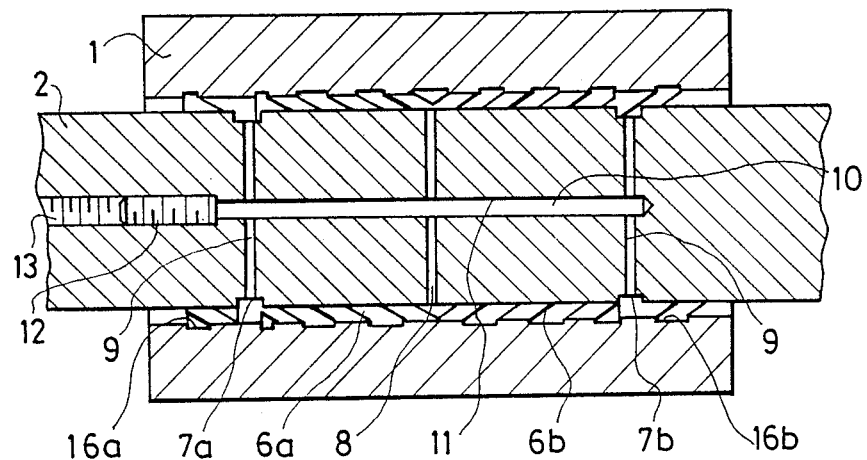
FIG. 11 is an internal cross-sectional view along an axis of a shaft in FIG. 10.
Figure 12:
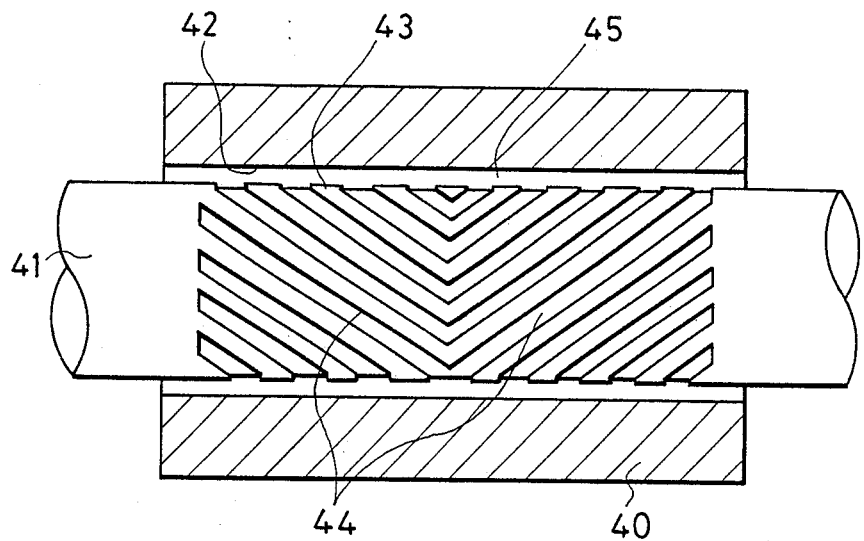
FIG. 12 shows a cross-sectional view along the axis of the conventional bearing unit, showing an outside face of the shaft, wherein symmetric spiral grooves are drawn by straight lines for the sake of simplicity of drawing.
Figure 13:
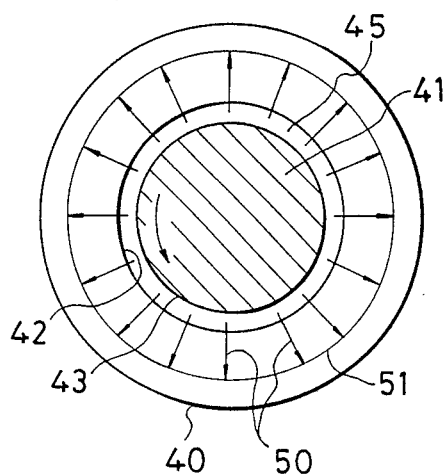
FIG. 13 and FIG. 14 are partial cross-sectional views showing the pressure distributions around the shaft 41 of FIG. 12.
Figure 14:
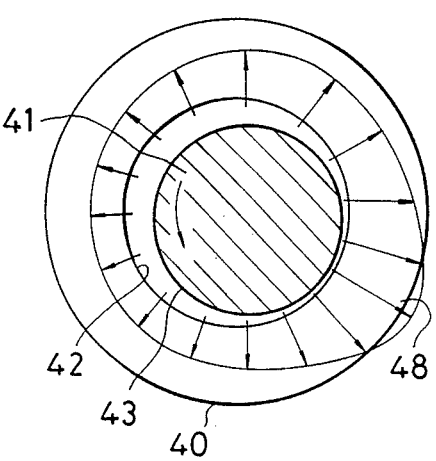
Figure 15:
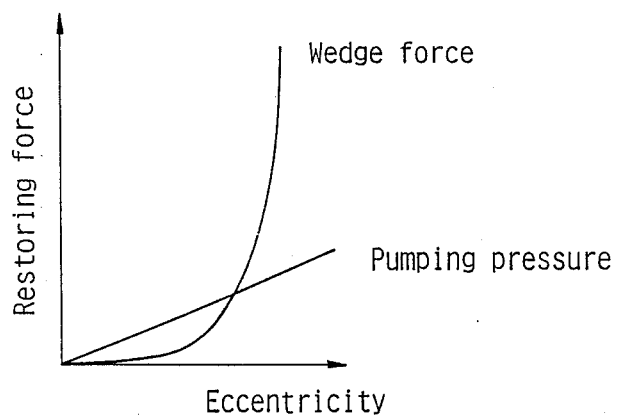
FIG. 15 is a graph showing the relation between restoring force and eccentricity.
Figure 16:
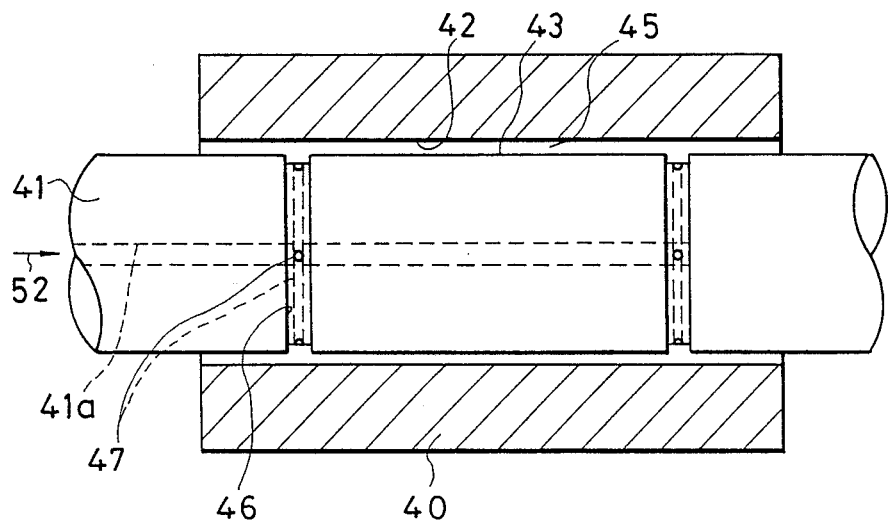
FIG. 16 is the cross-sectional view of other conventional bearing unit.
Figure 17:
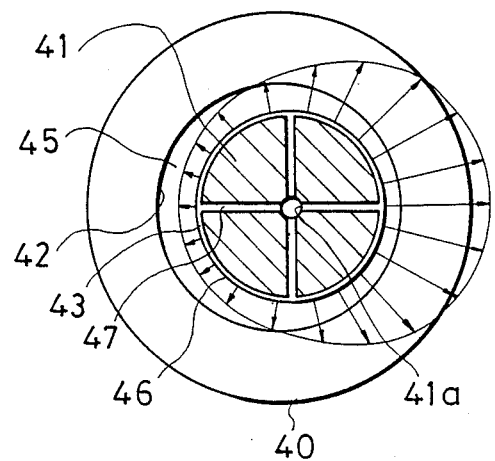
FIG. 17 is the partial cross-sectional view showing the pressure distribution around the shaft 41 of FIG. 16.

In the above-mentioned three embodiments shown in FIGS. 1 through 7(b), though the shaft 2 (or 22) is held by the bearing 1 (or 21), such reversed construction that the shaft 2 (or 22) is fixed and the cylindrical bearing 1 (or 21) is rotatably held around the shaft 2 (or 22), is also realizable. Further, the spiral grooves 6a and 6b (or 26) and the circumferential groove 7a and 7b (or 27) may be provided either on the shaft 2 (or 22) or on the cylindrical surface 3 (or 23). FIGS. 8, 9 and 10 are cross-sectional views showing still other embodiments of the present invention, and FIG. 11 is an internal cross-sectional view along an axis of the shaft in FIG. 10. In FIG. 8, both the spiral grooves 6a and 6b and the circumferential grooves 7a and 7b are provided on the cylindrical surface 3 of the bearing 1. In FIG. 9, the spiral grooves 6a and 6b are provided on the shaft 2, and the circumferential grooves 7a and 7b are provided on the cylindrical surface 3 of the bearing 1. In FIGS. 10 and 11, the spiral grooves 6a and 6b are provided on the cylindrical surface 3 of the bearing 1, and the circumferential grooves 7a and 7b are provided on the shaft 2. Also, as for the embodiments shown in FIG. 4 and FIG. 7(a), similar variations based on whether the spiral grooves 26 and/or the circumferential grooves 27 are provided on the shaft 22 or the bearing 21 can be realized.

Furthermore, for instance in FIG. 2, although at least three sets of radial passages 9, 8 and 9 are necessary for ordinary use, only one or two sets of radial passages 8 and/or 9 are applicable in case of single directional load disposing the passage 8 or 9 to a position where the restoring force is generated so as to offset the load. Also, since the radial passage 9 (or 29) is provided only for working as the fluid friction, the passage 9 (or 29) may be, not only orifice shaped, but also nozzle shaped which is ordinarily used for the static pressure bearing.

Further, the circumferential groove 7a and 7b (or 27) may be formed on a part of the circumference instead of making one round.

Further, grooves for generating pumping pressure are not limited to the spiral configuration, but other configurations which give a similar function are possible, as far as the lubricant is sent in one direction by pressure induced by the relative rotation between the cylindrical surface 3 (or 23) of the bearing 1 (or 21) and the shaft 2 (or 22).

While specific embodiments of the invention have been illustrated and described herein, it is realized that other modifications and changes will occur to those skilled in the art. It is therefore to be understood that the appended claims are intended to cover all modifications and changes that fall within the true spirit and scope of the invention.

What is claimed is:

1. A bearing unit serving as a static pressure bearing comprising:
   a bearing;
   a shaft which rotates relative to said bearing and includes a plurality of shallow grooves on a surface thereof for generating a pumping pressure, at least one deeper circumferential groove formed in a circumferential direction of said surface, and an inner passage which is formed in the shaft and communicates a part of said shallow groove with a part of said circumferential groove; and
   a fluid held in a gap formed between said bearing and said shaft which forms a hydrodynamic lubrication film between said bearing and said shaft by relative rotation of said bearing and said shaft with a fraction of said fluid being circulated between said plurality of shallow grooves and said circumferential groove through said inner passage and said gap by said pumping pressure with said bearing unit less said circumferential groove serving as a dynamic pressure bearing.

2. A bearing unit serving as a static pressure bearing comprising:
a bearing including a plurality of shallow grooves on a surface of said bearing for generating a pumping pressure, at least one deeper circumferential groove formed in a circumferential direction of said surface, and an inner passage which is formed in said bearing and connects a part of each shallow groove with a part in said circumferential groove;
a shaft which rotates relative to said bearing;
a fluid held in a gap formed between said bearing and said shaft, for forming a hydrodynamic lubrication film between said bearing and said shaft, by relative rotation of said bearing and said shaft with a fraction of said fluid being circulated between said plurality of shallow grooves and said circumferential groove through said inner passage and said gap by said pumping pressure with said bearing unit less said circumferential groove serving as a dynamic pressure bearing.

3. A bearing unit, serving as a static pressure bearing, comprising:
a bearing having at least one deep circumferential groove formed in a circumferential direction of a bearing surface thereof and an inner passage formed in said bearing which communicates a first part in said bearing surface with a second part in said circumferential groove;
a shaft which rotates relative to said bearing and has a plurality of shallower grooves on a surface thereof for generating a pumping pressure toward said first part; and a fluid, held in a gap formed between said bearing and said shaft, for forming a hydrodynamic lubrication film between said bearing and said shaft by relative rotation of said bearing and said shaft with a fraction of said fluid being circulated between said shallower grooves and said circumferential groove through said inner passage and said gap by said pumping pressure with said bearing unit, less said circumferential groove, serving as a dynamic pressure bearing.

4. A bearing unit, serving as a static pressure bearing, comprising:
a bearing which has a plurality of shallow grooves formed on a bearing surface thereof for generating a pumping pressure;
a shaft which rotates relative to said bearing and has at least one deeper circumferential groove formed in a circumferential direction of a surface thereof and an inner passage formed in said shaft for communicating a first part on said shaft opposing said plurality of shallow grooves with a second part in said circumferential groove;
a fluid, held in a gap formed between said bearing and said shaft, forming a hydrodynamic lubrication film between said bearing and said shaft by relative rotation of said bearing and said shaft, with a fraction of said fluid being circulated between said plurality of shallow grooves and said circumferential groove through said inner passage and said gap by said pumping pressure with said bearing unit, less said circumferential groove, serving as a dynamic pressure bearing.

5. A bearing unit in accordance with any one of claims 1-4, wherein
said plurality of shallow grooves for pumping has a spiral configuration which is substantially symmetrical with respect to an axial center part thereof.

* * * * *